United States Patent
Callaway et al.

(10) Patent No.: US 7,181,933 B2
(45) Date of Patent: Feb. 27, 2007

(54) TAPE SUBSTRATE AND TAPE MADE THEREFROM

(75) Inventors: Brian Callaway, Moore, SC (US); Randolph S Kohlman, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/927,705

(22) Filed: Aug. 27, 2004

(65) Prior Publication Data

US 2006/0042325 A1    Mar. 2, 2006

(51) Int. Cl.
*D04B 21/14* (2006.01)

(52) U.S. Cl. ............................................. 66/193; 66/195

(58) Field of Classification Search ................ 66/190, 66/192, 193, 195, 202; 442/313–315
See application file for complete search history.

(56) References Cited

U.S. PATENT DOCUMENTS

| | | | | |
|---|---|---|---|---|
| 4,015,449 A | * | 4/1977 | Matsuda et al. ............... 66/195 |
| 4,244,199 A | * | 1/1981 | Rhode ......................... 66/193 |
| 4,285,216 A | * | 8/1981 | Duhl ........................... 66/192 |
| 4,304,813 A | | 12/1981 | Elmore, Jr. .................. 428/253 |
| 4,388,364 A | * | 6/1983 | Sanders ....................... 442/313 |
| 4,444,026 A | | 4/1984 | Matsuda ....................... 66/202 |
| 4,636,427 A | | 1/1987 | Ohno et al. .................. 428/246 |
| 4,668,563 A | | 5/1987 | Buese et al. ................. 428/230 |
| 5,014,403 A | | 5/1991 | Buese ......................... 28/170 |
| 5,227,225 A | | 7/1993 | Mamish ....................... 428/214 |
| 5,353,486 A | | 10/1994 | Schmidt et al. ............... 28/167 |
| 5,461,885 A | | 10/1995 | Yokoyama et al. ............ 66/170 |
| 5,480,708 A | | 1/1996 | Cheng ......................... 428/231 |
| 5,507,079 A | | 4/1996 | Schmidt et al. ............... 28/170 |
| 5,641,560 A | | 6/1997 | Schmidt et al. .............. 428/220 |
| 5,706,677 A | | 1/1998 | Matsuda ....................... 66/192 |
| 5,950,457 A | | 9/1999 | Wagner, Jr. et al. ........... 66/192 |
| 6,006,552 A | | 12/1999 | Matsuda et al. ............... 66/193 |
| 6,082,148 A | | 7/2000 | Wakai et al. .................. 66/192 |
| 6,180,545 B1 | | 1/2001 | Okeya et al. ................. 442/308 |
| 6,183,861 B1 | | 2/2001 | Carroll ........................ 428/354 |
| 6,211,099 B1 | | 4/2001 | Hutto, Jr. et al. ............... 442/2 |
| 6,223,782 B1 | | 5/2001 | Watkins ....................... 139/383 |
| 6,282,926 B1 | | 9/2001 | Matsuda et al. ............... 66/192 |
| 6,330,892 B1 | | 12/2001 | Shimono ...................... 139/384 |

(Continued)

FOREIGN PATENT DOCUMENTS

WO    AO99/65433    12/1999

*Primary Examiner*—Danny Worrell
(74) *Attorney, Agent, or Firm*—Terry T. Moyer; Charloette C. Wilson (57) ABSTRACT

The present disclosure relates to a tape that comprises a weft-inserted warp knit fabric, which utilizes a combination stitch to secure the wales of the fabric. The combination stitch comprises a majority of successive chain stitches that are used with a minority of subsequent successive tricot stitches, such that the stitch follows the expression x+y, where x is the number of successive chain stitches and y is the number of subsequent successive tricot stitches. Contemplated x values are in the range of 5 to 15, and contemplated y values are in the range of 1 to 4. Multiple stitch formations can also be used (e.g., following an x+y/m+n/etc. configuration). The resulting weft-inserted warp knit fabric possesses superior dimensional stability and internal geometry, while maintaining the tearability requisite for a hand-tearable tape product.

8 Claims, 6 Drawing Sheets

U.S. PATENT DOCUMENTS

| | | |
|---|---|---|
| 6,332,341 B2 | 12/2001 | Matsuda ....................... 66/192 |
| 6,446,471 B1 | 9/2002 | Kaplancali .................... 66/192 |
| 6,503,855 B1 | 1/2003 | Menzies et al. ............ 442/328 |
| 2001/0027821 A1 | 10/2001 | Shimono .................... 139/384 |
| 2002/0115369 A1 | 8/2002 | Yokoyama et al. ......... 442/308 |
| 2003/0162017 A1 | 8/2003 | Weir et al. ................... 428/354 |
| 2004/0237597 A1* | 12/2004 | Oya et al. ..................... 66/195 |

* cited by examiner

TAPE SUBSTRATE AND TAPE MADE THEREFROM

TECHNICAL FIELD

The present disclosure relates to an improved substrate for pressure sensitive adhesive tapes, which utilizes one or more unique combination stitch formations to secure the yarns in a weft-inserted warp knit (WIWK) fabric. The combination stitch, as will be described herein, produces a tape that exhibits greater dimensional stability and that is less likely to experience problems such as stringing or neck-down. These features are attained while maintaining the requisite tearability in both the horizontal and vertical directions.

BACKGROUND

Pressure sensitive tapes having a fabric layer between two or more polymeric layers (such as films, adhesives, etc.) are well known. Previous efforts to create these types of pressure sensitive tapes have, in large part, included a woven substrate as the textile component. Such substrates are susceptible to raveling along the cut edges of the finished tape. For this reason, woven substrates used in tapes are generally treated at the edges, for example, by tucking the edges or otherwise sealing them, to minimize this problem.

More recently, it was discovered that an acceptable tape substrate could be manufactured using a weft-inserted warp knit fabric as the textile reinforcing component. Generally, the existing weft-inserted warp knit fabric performs well for its intended purposes. It is easily torn in both horizontal and vertical directions, and it adheres well to a wide variety of surfaces. Such a tape is described in U.S. Pat. No. 5,017,425, which is incorporated herein by reference.

Despite its acceptable performance, the previous weft-inserted warp knit fabric exhibits several problems that are the result of the fabric's relative lack of dimensional stability. Because the chain stitches in the weft-inserted warp knit fabric run vertically through the fabric without any interlocking between chains, there is a tendency for the yarns to shift horizontally during manufacture of either the fabric or the tape. As a result, two situations are observed. First, it is difficult to handle the fabric substrate after it is wound onto a take-up roll without shifting the stitch yarns. Second, because of the fabric's shifted yarns, the finished tape often lacks uniform internal geometry, a visually apparent flaw that, if severe, can result in the finished tape being rejected as "off-quality."

Another problem results from the fabric's relative lack of dimensional stability. This issue is known as "stringing," a condition that occurs during processing if the film that provides the outer surface of the tape is not properly aligned with the fabric. In this situation, the raw edges of the fabric are left exposed, and the loose yarns (that is, those not secured to the film) slide off the fabric as it passes over the calendar roll. As the master roll is wound, these loose ends on the edges of the fabric can become tangled with one another or, even worse, can become adhered to the adhesive side of the roll. In many instances, especially when the strings on the edge of the fabric become adhered to the underside of the tape, the stringing is so significant that the smaller rolls made from the outermost edges of the master roll must be discarded. This waste is a significant problem for tape manufacturers.

One contemplated approach for solving the stringing problem is to include a plurality of tricot stitches in the weft-inserted warp knit fabric substrate. This has the effect of locking adjacent wales together, so that shifting and stringing are substantially reduced. However, replacing all of the chain stitches with tricot stitches results in a condition commonly known as "neck-down", in which the fabric telescopes or collapses inward on itself to create a narrower than desired width. Clearly, this tendency would not be acceptable in production of a flat tape that must be rolled up on itself for packaging. As a further complication, a tricot knit fabric is more likely to be difficult to tear uniformly.

The present disclosure addresses and overcomes these problems.

SUMMARY

The present disclosure relates to a tape that comprises a weft-inserted warp knit fabric, which utilizes a combination stitch to secure the wales of the fabric. The combination stitch comprises a majority of successive chain stitches that are used in conjunction with a minority of subsequent successive tricot stitches, such that the stitch configuration follows the expression x+y, where x is the number of successive chain stitches and y is the number of subsequent successive tricot stitches.

When the fabric is knit on machines having pattern wheels that control the stitch formation, the x and y values are preferably based on the number of slots found in standard pattern wheels (typically, 12 or 16). In particular, x+y or a multiple of x+y must equal the number of slots in the pattern wheel. A particularly preferred embodiment is that case for which y=1. Accordingly, when y=1, the preferred x values for a 12-slot pattern wheel are 5 and 11, and the preferred x values for a 16-slot pattern wheel are 7 and 15. As will be discussed later, a 3+1 stitch configuration results in a fabric with unacceptable "neck-down."

Alternatively, one skilled in the art may substitute a pattern chain for the pattern wheel described above. The chain could possess the same number of links as the pattern wheel has slots. In a second embodiment, the chain could possess more links than that of the pattern wheel by using one or more idler rolls to provide support for a longer length (that is, more links), thereby extending the stitch configuration repeats that may be achieved. A pattern chain could be used to create a wide range of stitch configurations, including, by way of example only and not as limitations, x+y stitch configurations in which the x value in the stitch is the range of 5 to 15 and the y value is in the range of 1 to 4.

Newer knitting machines replace pattern wheels or chains with electronic control systems. In these systems, there are far greater possibilities for the stitch configurations that may be achieved. The x+y stitch configurations described herein can easily be reproduced using these types of systems as well.

By using a stitch pattern that combines a majority of successive chain stitches with a minority of subsequent successive tricot stitches, and preferably using a stitch pattern having an x+y configuration, a weft-inserted warp knit fabric is created that possesses superior dimensional stability and internal geometry, while maintaining the tearability requisite for a hand-tearable tape product. Further, the gauge (i.e., the thickness) of the tape is substantially the same as the previous weft-inserted warp knit fabric substrates.

BRIEF DESCRIPTION OF THE DRAWINGS

Other objects and advantages of the invention will become readily apparent from the detailed description

3 included in the specification, with reference being made to the accompanying drawings, in which:

DETAILED DESCRIPTION

Figure 1:
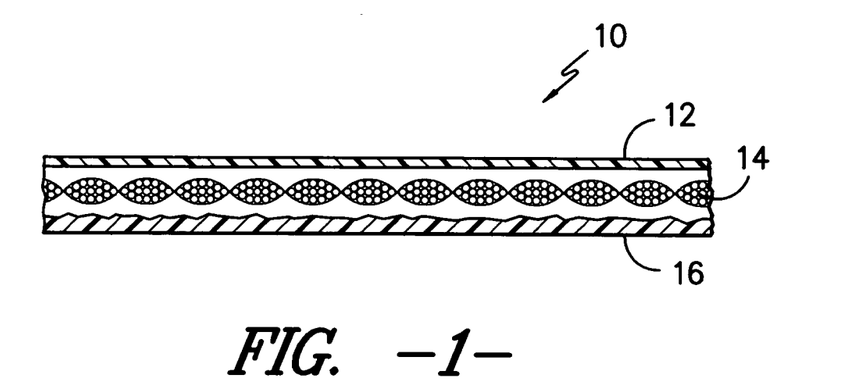
FIG. 1 is a cross-sectional, schematic view of a pressure sensitive tape.

As is well known in the trade, the pressure sensitive tape 10 is manufactured in wide widths and then cut to the desired width for the desired use. As shown in FIG. 1, the tape 10 consists of a base layer of a film 12, a carrier layer of a weft-inserted warp knit fabric 14, and a layer of a pressure sensitive adhesive 16. In one embodiment, film layer 12 comprises polyethylene having a thickness of about three thousandths of an inch ("mils"), although other film materials and thicknesses may be used.

The fabric that is used to create the finished tape product is produced basically as described in U.S. Pat. No. 5,017,425, with the exception being the inclusion of one or more combination stitches that are discussed herein. The fabric is knit on a weft-insertion, warp knitting machine designed to allow the insertion of five to twelve picks per inch, and preferably nine picks per inch.

A typical weft-insertion, warp knit machine arrangement includes a plurality of guide bars that supply warp yarns to a row of needles to form the WIWK fabric. Generally, a WIWK fabric has sets of warp and weft yarns held together by a stitch yarn. The pattern of the stitch yarn can be varied. A typical WIWK fabric that is commonly used as a tape substrate has only two yarns: a weft yarn and a stitch yarn, which forms the warp.

The fabric, as it is being knitted, is supplied outwardly from the needles and sequentially over a driven roll, an idler roll, and a second driven roll to a supply roll. The sinker bar is set in a fixed position, and a fabric hold-down bar is used to press down on the newly formed loops as they are formed, thereby preventing them from breaking out as they are released from the needle. The fabric hold-down bar consists of a plurality of blocks interconnected and held in place by suitable screws adjacent one another to hold down the fabric loops all the way across the knitting machine.

The stitch yarns (that form the warp of the knit fabric) are preferably comprised of continuous filament polyester yarns having a size in the range of 20 denier to 150 denier and more preferably a size around 40 denier. "Wales" is another term used to describe the rows of stitches that are present in the machine direction.

In conventional manner, the weft yarn is inserted while the yarn loops are being formed. The weft-inserted yarns, which are part of the courses of the WIWK fabric, preferably comprise a textured continuous filament polyester yarn having a size in the range of 20 denier to 300 denier and more preferably a size around 150 denier.

Although the preferred yarn type for this application is polyester, other thermoplastic yarn types known to those of skill in the art, such as nylon and polypropylene, blends thereof, or blends of these yarn types with cotton (e.g., poly/cotton), could be used for either the warp or weft yarns. The yarns for both the warp and weft could be textured or untextured.

A hook engages the stitching yarn in the guide bars and pulls it into a loop down through the previously formed loop on the fixed sender bar. In conventional manner, the weft yarns have been laid in on the back side of the needles. The knit fabric is pulled away from the needles by the drive roll, and the needle moves upwardly through the loop while the fingers of the fabric hold-down bar maintain a downward pressure on the fabric. Then the guide bars are swung through and around the needles and back again to form another loop in the hook or eye of the needle. The needles are retracted to allow the loop to be knocked over or cast off as the needle drops down, and the closing wire engages the hook or eye to keep the newly formed loop in position until the action is started over again with the next stitch. It should be noted that during this whole operation the sinker bar remains fixed, and the hold-down bar remains engaged on the previously formed loops to prevent them from breaking out after being cast off the needle.

To create the combination stitch described herein, the stitch yarn that connects a first row of stitches to an adjacent row of stitches creates a chain stitch for a number of successive courses (e.g., seven) before performing a tricot stitch for some fewer number of subsequent successive courses (preferably one). In one embodiment, this stitch yarn is controlled by a pattern wheel, which moves the stitching yarn bar over one needle to create the tricot stitch. (As has been discussed, pattern chains or computer-controlled systems may also be used.) After the tricot stitch is completed, the yarn is moved back to its original position. The pattern of chain stitches and tricot stitches is then repeated.

Figure 6:
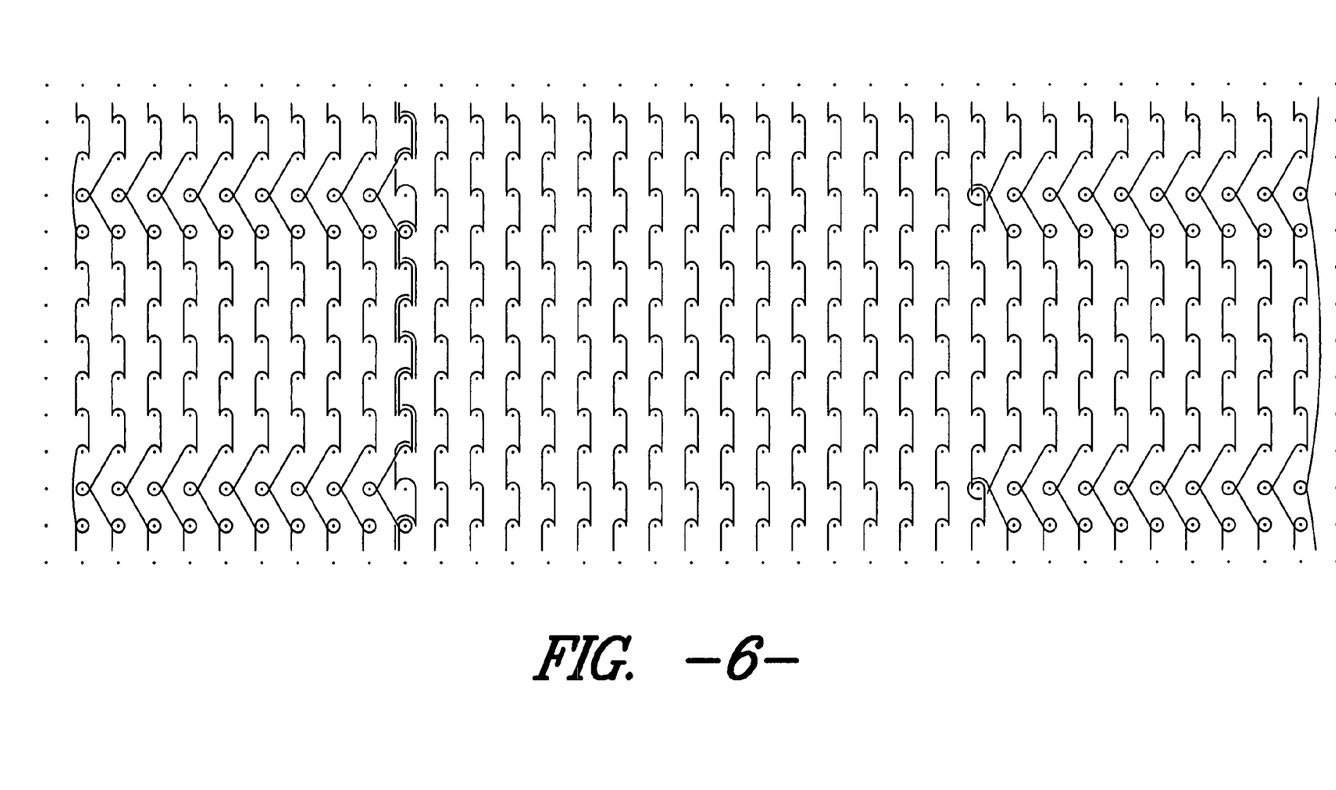
FIG. 6 is a point diagram of a fabric in which a 7+1 combination stitch described herein is used on the selvedges and a conventional chain stitch is incorporated in the body of the fabric.

The combination stitch can be used across the entire width of the fabric or in only one or more localized areas. One preferred embodiment include the combination stitch merely along the outermost edges as shown in FIG. 6 (in an area typically referred to as a selvedge), which would require the use of a second knitting bar.

In one embodiment, the combination stitch comprises a majority of successive chain stitches that are used with a minority number of subsequent successive tricot stitches, such that the stitch configuration follows the expression x+y, where x is the number of successive chain stitches and y is the number of subsequent successive tricot stitches. The x and y values are preferably based on the number of slots in standard pattern wheels (typically, 12 or 16), when a knitting machine having a pattern wheel is used. In particular, x+y or a multiple of x+y must equal the number of slots in the pattern wheel. Either one or two cycles of the combination stitch may be used. Accordingly, when y=1, the preferred x values for a 12-slot pattern wheel are 5 and 11, and the preferred x values for a 16-slot pattern wheel are 7 and 15. These stitches are illustrated in FIGS. 2–5.

Employing a WIWK machine having a pattern wheel limits the available combinations of stitch configurations that may be used, because the x+y expression must be equal to a factor of the number of slots in the pattern wheel. However, using a pattern chain or electronic control removes these limitations. With these kinds of systems, there are more choices for the x and y values used in the stitch configuration. As described herein, a WIWK fabric with a 3+1 stitch configuration results in excessive neck-down. Therefore, stitch configurations where x values are at least 5 are anticipated to provide adequate performance. These x values include integers in the range of 5 to 15, and the y values are in the range of 1 to 4. Accordingly, by way of example and not limitation, a 14+1, 14+2, 14+3, or 14+4 stitch configuration could be used.

One contemplated alternative to the x+y stitch configuration discussed herein is a variation in which two or more combination stitches are used. A fabric having multiple combination stitch configurations could be created in which, for example, a first combination stitch having a x+y pattern is followed by a second combination stitch having an a+b pattern, where x and a represent the number of successive chain stitches and y and b represent the number of subsequent successive tricot stitches, and x is not necessarily equal to a and y is not necessarily equal to b. Other stitch configurations could also be used (e.g., an m+n, where m and n are different integers and are not necessarily equal to their predecessors). The patterns could be chosen from any combination of stitch configurations having numbers of chain stitches and tricot stitches in the preferred ranges described herein. As contemplated herein, the values for the number of successive chain stitches (represented by x, a, and m) are integers in the range of 5 to 15, and the values for the number of subsequent successive tricot stitches (represented by y, b, and n) are integers in the range of 1 to 4.

Figure 2:
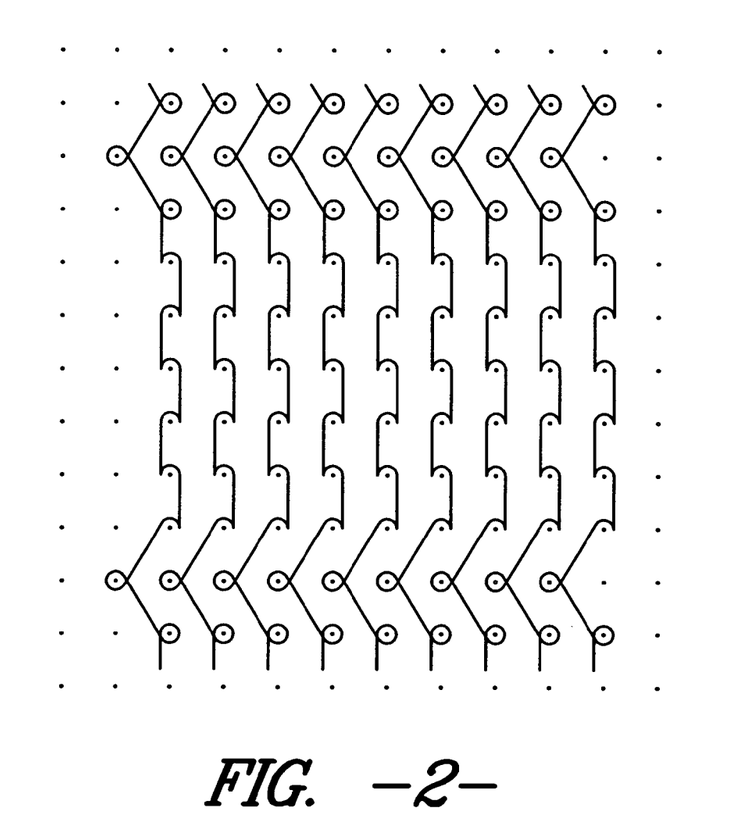
FIG. 2 is a point diagram of one embodiment of a combination stitch described herein, where the stitch configuration includes 7 chain stitches and 1 tricot stitch.

Turning now to the drawings, FIG. 2 shows a point diagram of the 7+1 stitch described above. As can be seen, the stitch yarn is used to create seven chain stitches before moving over one yarn and creating a tricot stitch. The tricot stitch connects adjacent wales to one another, thereby creating a more dimensionally stable fabric.

Figure 3:
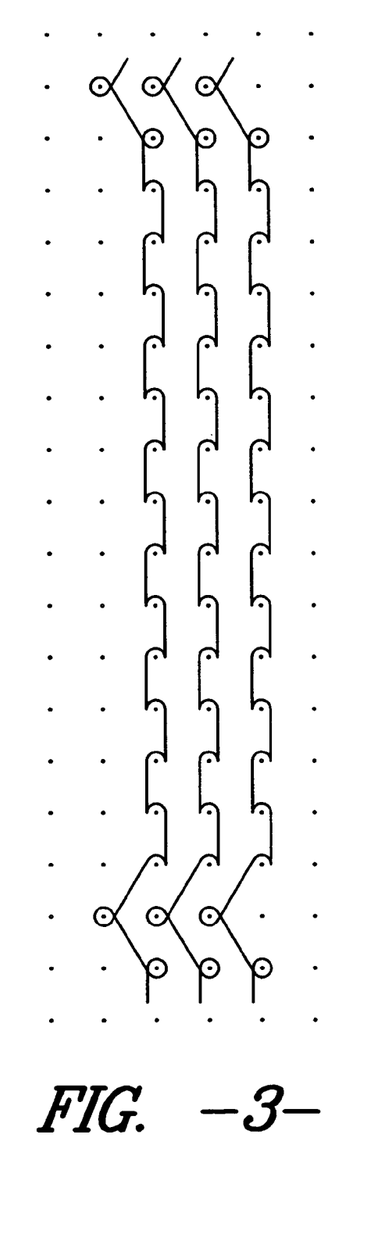
FIG. 3 is a point diagram of a second embodiment of a combination stitch described herein, where the stitch configuration includes 15 chain stitches and 1 tricot stitch.

FIG. 3 shows a point diagram of a 15+1 stitch configuration, in which the stitch yarn is used to create fifteen chain stitches before moving over one yarn and creating a tricot stitch. As before, the tricot stitch is used to connect adjacent wales to one another.

Figure 4:
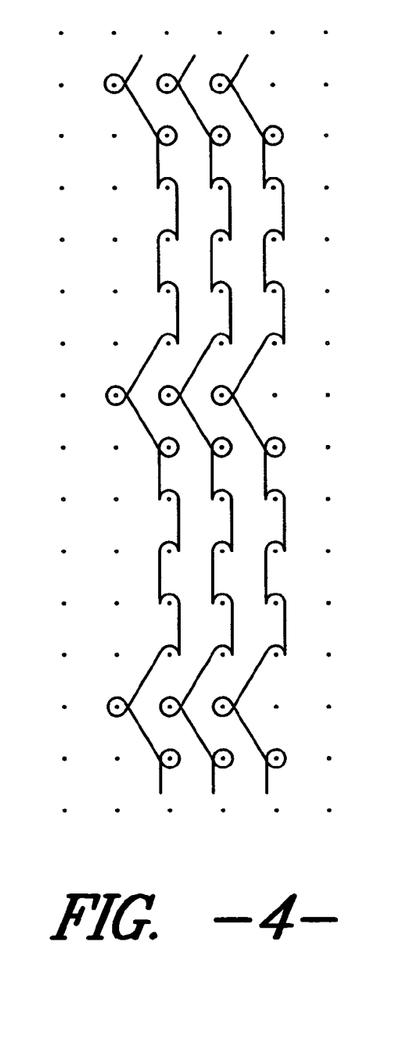
FIG. 4 is a point diagram of another embodiment of a combination stitch described herein, where the stitch configuration includes 5 chain stitches and 1 tricot stitch.

FIG. 4 shows a point diagram of a 5+1 stitch configuration. In this instance, the stitch yarn is used to create five chain stitches before moving over one yarn and creating a tricot stitch.

Figure 5:
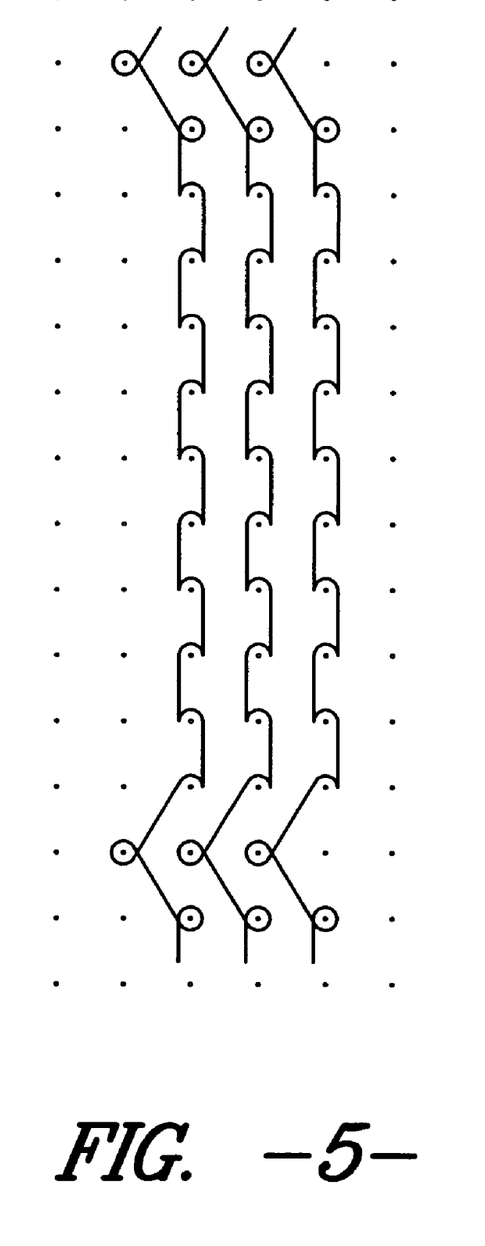
FIG. 5 is a point diagram of yet another embodiment of a combination stitch described herein, where the stitch configuration includes 11 chain stitches and 1 tricot stitch.

FIG. 5 shows a point diagram of an 11+1 stitch configuration. In this case, the stitch yarn is used to create eleven chain stitches before moving over one yarn and creating a tricot stitch.

As described above, the combination stitch configuration can be used across the width of the fabric. Alternately, the combination stitch can be utilized only in a localized area of the fabric, such as the selvedges, with chain stitches being used in the remainder of the fabric (as shown in FIG. 6). The use of two different knitting bars would be required in this case. As mentioned, the selvedge area can range in size from a minimum of two needles wide to an upper bound of two or more inches, depending on manufacturer preference. As has been mentioned, stringing is a problem primarily associated with loose yarns in the selvedge. Having the combination stitch present in the selvedge areas of the fabric effectively eliminates this problem. It has been found that an effective solution can be provided with localized use of the stitch, as well as uniform use of the stitch across the width of the fabric.

Once the fabric has been knitted, the production of the tape can begin. A typical process for production is described as follows. The fabric is supplied from a supply roll and is mated with a polyethylene film from a second supply roll at the nip of two calender rolls. The polyethylene film forms the face of the finished tape. A kiss roll positioned behind the first calender roll supplies a pressure sensitive adhesive, which is pressed into and through the fabric to laminate the fabric to the base film. The pressure sensitive adhesive utilized herein is one of a number of adhesives known to those of skill in the art. By way of example, rubber gum adhesives and non-latex-based synthetic adhesives are suitable for use herein.

Thus, when the combined components are allowed to set after passing through the nip of the calender rolls, a pressure sensitive tape is provided. The completed tape is then taken up as a master roll, ready for slitting.

EXAMPLE 1

A weft-inserted, warp knit fabric was created, having a 18×7.5 construction, using 150 denier textured continuous polyester filament yarns as the weft-inserted yarns and 40 denier continuous filament polyester yarns as the stitch yarns. The fabric included a combination stitch having a 7+1 configuration. The fabric was made on a Liba weft-insertion warp knit machine, having a 16-slot pattern wheel.

The resulting fabric was manufactured into a pressure sensitive adhesive tape as described previously, using a 3 mil polyethylene film and a rubber gum adhesive. During the production of the tape, the fabric of Example 1 effectively eliminated the problem with stringing on the edges of the master roll.

EXAMPLE 2

A weft-inserted, warp knit fabric was created, having a 18×7.5 construction, using 150 denier textured continuous polyester filament yarns as the weft-inserted yarns and 40 denier continuous filament polyester yarns as the stitch yarns. The fabric included a combination stitch having a 3+1 configuration. The fabric was made on a Liba weft-insertion warp knit machine, having a 16-slot pattern wheel.

The fabric of Example 2 was not made into a pressure sensitive adhesive tape, because it exhibited too high a degree of neck-down.

Comparative Example A

A weft-inserted, warp knit fabric was created, having a 18×7.5 construction, using 150 denier textured continuous polyester filament yarns as the weft-inserted yarns and 40 denier continuous filament polyester yarns as the stitch yarns. The fabric included chain stitches throughout. The fabric was made on a Liba weft-insertion warp knit machine, having a 16-slot pattern wheel.

The resulting fabric was manufactured into a pressure sensitive adhesive tape as described previously, using a 3 mil polyethylene film and a rubber gum adhesive. During the production of the tape, the fabric of Comparative Example A exhibited some problems with stringing on the edges of the master roll.

Dimensional Stability Comparison

To evaluate the dimensional stability of the fabric before it is made into a tape, a Fabric Shift Tester, Model 7730, as manufactured by United States Testing Company, Inc. of Hoboken N.J. was used. This equipment is the same as specified by ASTM D1336 for testing the shift of yarns in a woven fabric. Since the yarns of a weft-inserted, warp knit fabric in this construction range are much more apt to shift than those of a woven fabric, the procedure for testing as in ASTM D1336 was modified slightly.

Ordinarily, the fabric shift tester provides for a frame that the subject fabric is attached into and a rubber nip, resulting from a fixed cylindrical piece of rubber and a second cylindrical piece of rubber on a pendulum attachment that, when dropped against the first cylinder, forms the nip. A weight is provided to place on top of the pendulum arm for increasing the pressure in the nip. A mechanism is provided for translating the fabric in the frame through the rubber nip. The frame is translated through the nip twice at one location and then moved to a second location on the other side of the fabric and again translated through the nip twice so that two opposing sides of the fabric are distorted. The amount of distortion is then measured.

In our procedure, the pendulum is not engaged so that the fabric is not in a nip but only tensioned (by the frame) across the lower rubber cylinder. The frame is translated over the lower rubber cylinder in only one location once (instead of twice).

The slippage of the warp yarns for the fabrics of Example 1 and Comparative Example A were tested (that is, before the fabrics were made into tapes). In the area of the fabric that was distorted by the rubber cylinder, the number of warp yarns per inch were counted and compared to the original number of warp yarns per inch.

TABLE 1

| Sample | Undistorted Warp Yarns/inch | Distorted Warp Yarns/inch |
|---|---|---|
| Comparative Sample A | 18 | 8–10 |
| Example 1 | 18 | 0–3 |

Figure 7A:
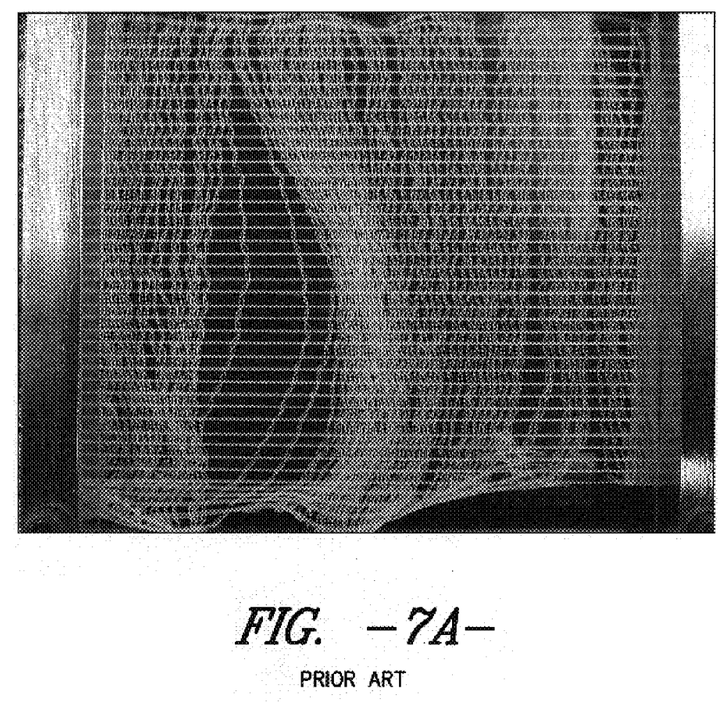
FIG. 7A is a photograph of a conventional weft-inserted warp knit fabric that has been subjected to dimensional stability testing.
Figure 7B:
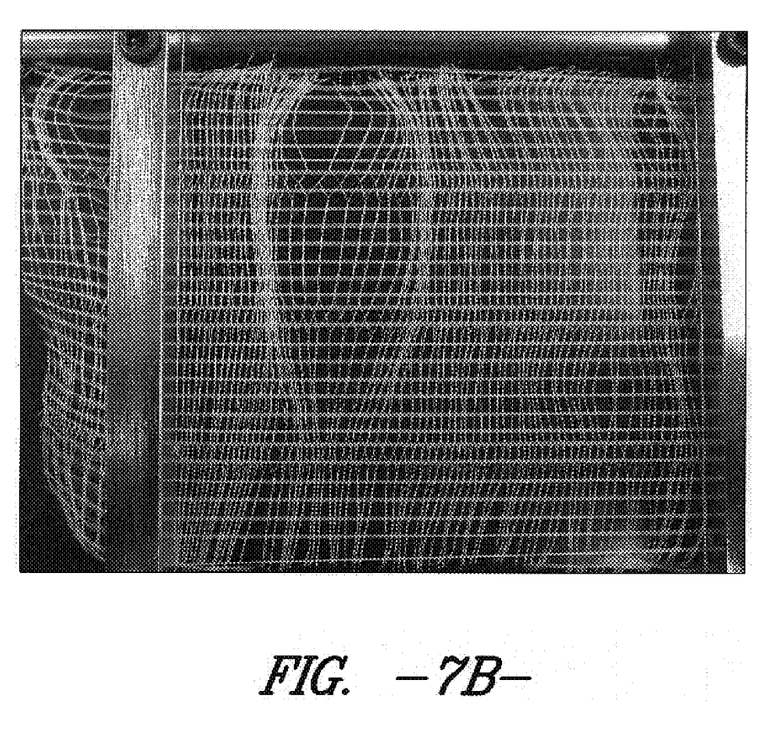
FIG. 7B is a photograph of a weft-inserted warp knit fabric utilizing a combination stitch described herein, in which the fabric has been subjected to dimensional stability testing.

The fabrics of Comparative Sample A and Example 1, after testing, are shown in FIGS. 7A and 7B, respectively. In FIG. 7A, which depicts Comparative Sample A after distortion testing, one observes an area in which the vertical courses are bunched away from the area in which the nip was positioned. This is the result of pressure being applied to the multiple rows of (previously) parallel and unconnected chain stitches.

FIG. 7B depicts the present fabric, including a 7+1 stitch configuration, after distortion testing. In the center portion of the photograph, one observes some bunching of the vertical courses to either side of the area in which the nip was positioned. Whereas very few vertical rows remained in the tested area of the fabric of FIG. 7A, many more vertical courses remained in the tested area of the fabric of FIG. 7B. It can be concluded, therefore, that the fabric of FIG. 7B, which includes the combination stitch described herein, is more dimensionally stable than the conventional fabric of FIG. 7A.

Tensile Strength Comparison

Using the tapes created according to Example 1 and Comparative Sample A, in which the respective fabrics were incorporated in the process described herein, a comparison of tensile strength was conducted.

Tensile strength is a measure of the pounds of force required to break the finished tape under pressure in a certain direction. This test measures the forced required to break the finished tape in the warp direction. The tensile strength test was conducted according to ASTM D5035. Five samples of each fabric were tested, with the average of the measurements being shown in TABLE 2.

TABLE 2

| Sample | Tensile Strength (lbf) |
|---|---|
| Comparative Sample A | 42.3 |
| Example 1 | 36.9 ± 0.48 |

The fabric of Example 1 exhibits slightly less tensile strength than that of Comparative Sample A, but was still determined to be sufficient for the application.

Tear Strength Comparison

Using the tapes created according to Example 1 and Comparative Sample A, in which the respective fabrics were incorporated in the process described herein, a comparison of tear strength was made.

Tear strength is a measure of the pounds of force required to tear the finished tape in a particular direction. In this test, which was conducted according to ASTM D573, the tapes were torn in the horizontal direction (that is, across the wales). Five samples of each fabric were tested, with the average of the measurements being shown in TABLE 3.

TABLE 3

| Sample | Tear Strength (lbf) |
|---|---|
| Comparative Sample A | 1.57 |
| Example 1 | 1.43 ± 0.63 |

The results of this comparison show that there was no statistical difference in the tear strength between the tapes made from the fabrics of Example 1 and Comparative Sample A.

Gage Comparison

"Gauge" is another term for a measure of thickness of the finished tape (i.e., the fabric after lamination and application of adhesive). The results are achieved by measuring the tape's thickness with a micrometer. The measurements are made in thousandths of an inch ("mils").

It is important to control the gauge of the finished tape, so that the diameter of a roll of finished tape having a certain length remains substantially similar to that produced using the fabric of Comparative Sample A. The measurements are shown below in TABLE 4.

TABLE 4

| Sample | Gauge (mils) |
|---|---|
| Tape made according to Comparative Sample A | 8.8 |
| Tape made according to Example 1 | 8.2 |

The results indicate that the tape made using the fabric of Example 1 is substantially similar in thickness to the tape made using the fabric of Comparative Sample 1. This result is positive for the tape manufacturer.

It is contemplated that the resulting tape made with the fabric described herein can be employed for many uses such as duct tape, packaging tape, medical tape, veterinary tape, athletic tapes, carpet tape, etc.

The resultant tape made from a weft-inserted warp knit fabric having a stitch configuration of x+y (or multiple stitch configurations, such as x+y/a+b/m+n/etc.) as described herein exhibits greater dimensional stability and is less likely to exhibit stringing during manufacture. Furthermore, the weft-inserted warp knit fabric described herein does not adversely affect the finished tape's tear strength, tensile strength, or gauge. For these reasons, the tape reinforcement represents an advance over the prior art.

We claim:

1. A fabric reinforcement for a pressure sensitive tape consisting of a weft-inserted warp knit fabric, said weft-inserted warp knit fabric having a plurality of weft yarns and a warp consisting of a plurality of stitch yarns, wherein each stitch yarn has a stitch formation that comprises at least one combination of successive chain stitches and at least one tricot stitch after said at least one combination of successive chain stitches.

2. The fabric reinforcement of claim 1, wherein said stitch formation has an x+y configuration, where x represents a number of successive chain stitches, where y represents a number of subsequent successive tricot stitches. and where x is in the range of 5 to 15 and y is in the range of 1 to 4.

3. The fabric reinforcement of claim 2, wherein said stitch formation has a 7+1 configuration.

4. The fabric reinforcement of claim 1, wherein said stitch formation includes multiple stitch configurations.

5. The fabric reinforcement of claim 1, wherein said stitch formation is localized in areas of said waft-inserted warp knit fabric.

6. The fabric reinforcement of claim 5, wherein said waft-inserted warp knit fabric has selvedge areas in which said stitch formation is localized.

7. The fabric reinforcement of claim 1, wherein said weft-inserted warp knit fabric comprises yarns selected from the group consisting of polyester, nylon, polypropylene, blends thereof, and blends thereof with cotton.

8. The fabric reinforcement of claim 7, wherein said waft-inserted warp knit fabric comprises polyester yarns.

* * * * *